(12) United States Patent
Pan et al.

(10) Patent No.: US 11,864,249 B2
(45) Date of Patent: Jan. 2, 2024

(54) METHOD AND APPARATUS FOR SIDELINK IDENTIFIER CHANGE IN A WIRELESS COMMUNICATION SYSTEM

(71) Applicant: ASUSTek Computer Inc., Taipei (TW)

(72) Inventors: Li-Te Pan, Taipei (TW); Richard Lee-Chee Kuo, Taipei (TW)

(73) Assignee: ASUSTek Computer Inc., Tapei (TW)

( * ) Notice: Subject to any disclaimer, the term of this patent is extended or adjusted under 35 U.S.C. 154(b) by 0 days.

(21) Appl. No.: 18/116,869

(22) Filed: Mar. 3, 2023

(65) Prior Publication Data
US 2023/0209619 A1 Jun. 29, 2023

Related U.S. Application Data

(63) Continuation of application No. 17/338,860, filed on Jun. 4, 2021, now Pat. No. 11,627,616, which is a continuation of application No. 17/132,794, filed on Dec. 23, 2020, now Pat. No. 11,057,950.

(60) Provisional application No. 62/991,266, filed on Mar. 18, 2020.

(51) Int. Cl.
*H04W 76/11* (2018.01)
*H04L 1/1607* (2023.01)

(52) U.S. Cl.
CPC .......... *H04W 76/11* (2018.02); *H04L 1/1607* (2013.01)

(58) Field of Classification Search
CPC ........ H04W 76/11; H04W 8/26; H04L 1/1607
See application file for complete search history.

(56) References Cited

U.S. PATENT DOCUMENTS

| 10,687,386 B2* | 6/2020 | Pan ................. H04W 76/40 |
| 2014/0204771 A1* | 7/2014 | Gao ................. H04W 36/22 370/252 |
| 2020/0314613 A1* | 10/2020 | Lee ................. H04W 4/70 |

OTHER PUBLICATIONS

3GPP TS 24.587 V2.0.0 (Mar. 6, 2020), 3rd Generation Partnership project: Technical Specification Group Core Network and Terminals; Vehicle-to-Everything (V2X) services in 5G system (Year: 2020).*

* cited by examiner

*Primary Examiner* — Mohammad S Anwar
(74) *Attorney, Agent, or Firm* — Cooper Legal Group LLC

(57) ABSTRACT

A method and apparatus are disclosed from the perspective of a first UE (User Equipment) to update Layer-2 Identities (IDs). In one embodiment, the method includes the first UE establishing a unicast link with a second UE, wherein a first Layer-2 ID of the first UE and a second Layer-2 ID of the second UE are used for data transmission and reception on the unicast link. The method further includes the first UE transmitting a Link Identifier Update Request message for the unicast link to the second UE, wherein the Link Identifier Update Request message includes a new first Layer-2 ID of the first UE. The method also includes the first UE receiving a Link Identifier Update Accept message for the unicast link from the second UE, wherein the Link Identifier Update Accept message includes a new second Layer-2 ID of the second UE. In addition, the method includes the first UE passing the new first Layer-2 ID of the first UE and the new second Layer-2 ID of the second UE down to the lower layer(s) after a Link Identifier Update Acknowledgement (ACK) message is passed to the lower layer(s) for transmission in response to reception of the Link Identifier Update Accept message.

14 Claims, 9 Drawing Sheets

METHOD AND APPARATUS FOR SIDELINK IDENTIFIER CHANGE IN A WIRELESS COMMUNICATION SYSTEM

CROSS-REFERENCE TO RELATED APPLICATIONS

The present application claims priority to and is a continuation of U.S. application Ser. No. 17/338,860, filed on Jun. 4, 2021, entitled "METHOD AND APPARATUS FOR SIDELINK IDENTIFIER CHANGE IN A WIRELESS COMMUNICATION SYSTEM", which claims priority to and is a continuation of U.S. application Ser. No. 17/132,794, filed on Dec. 23, 2020, entitled "METHOD AND APPARATUS FOR SIDELINK IDENTIFIER CHANGE IN A WIRELESS COMMUNICATION SYSTEM", which claims the benefit of U.S. Provisional Patent Application Ser. No. 62/991,266 filed on Mar. 18, 2020. The entire disclosure of U.S. application Ser. No. 17/338,860, the entire disclosure of U.S. application Ser. No. 17/132,794 and the entire disclosure of U.S. Provisional Patent Application Ser. No. 62/991,266 are incorporated herein in their entirety by reference.

FIELD

This disclosure generally relates to wireless communication networks, and more particularly, to a method and apparatus for sidelink identifier change in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a first UE (User Equipment) to update Layer-2 Identities (IDs). In one embodiment, the method includes the first UE establishing a unicast link with a second UE, wherein a first Layer-2 ID of the first UE and a second Layer-2 ID of the second UE are used for data transmission and reception on the unicast link. The method further includes the first UE transmitting a Link Identifier Update Request message for the unicast link to the second UE, wherein the Link Identifier Update Request message includes a new first Layer-2 ID of the first UE. The method also includes the first UE receiving a Link Identifier Update Accept message for the unicast link from the second UE, wherein the Link Identifier Update Accept message includes a new second Layer-2 ID of the second UE. In addition, the method includes the first UE passing the new first Layer-2 ID of the first UE and the new second Layer-2 ID of the second UE down to the lower layer(s) after a Link Identifier Update Acknowledgement (ACK) message is passed to the lower layer(s) for transmission in response to reception of the Link Identifier Update Accept message.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TS24.587 v2.0.0, "Vehicle-to-Everything (V2X) services in 5G System (5GS) Stage 3". The standards and documents listed above are hereby expressly incorporated by reference in their entirety.

Figure 1:
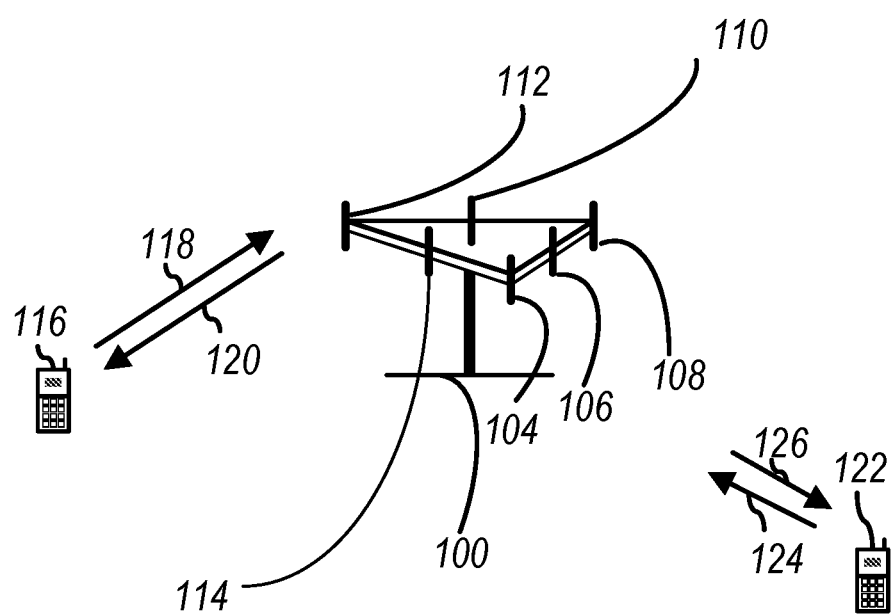
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
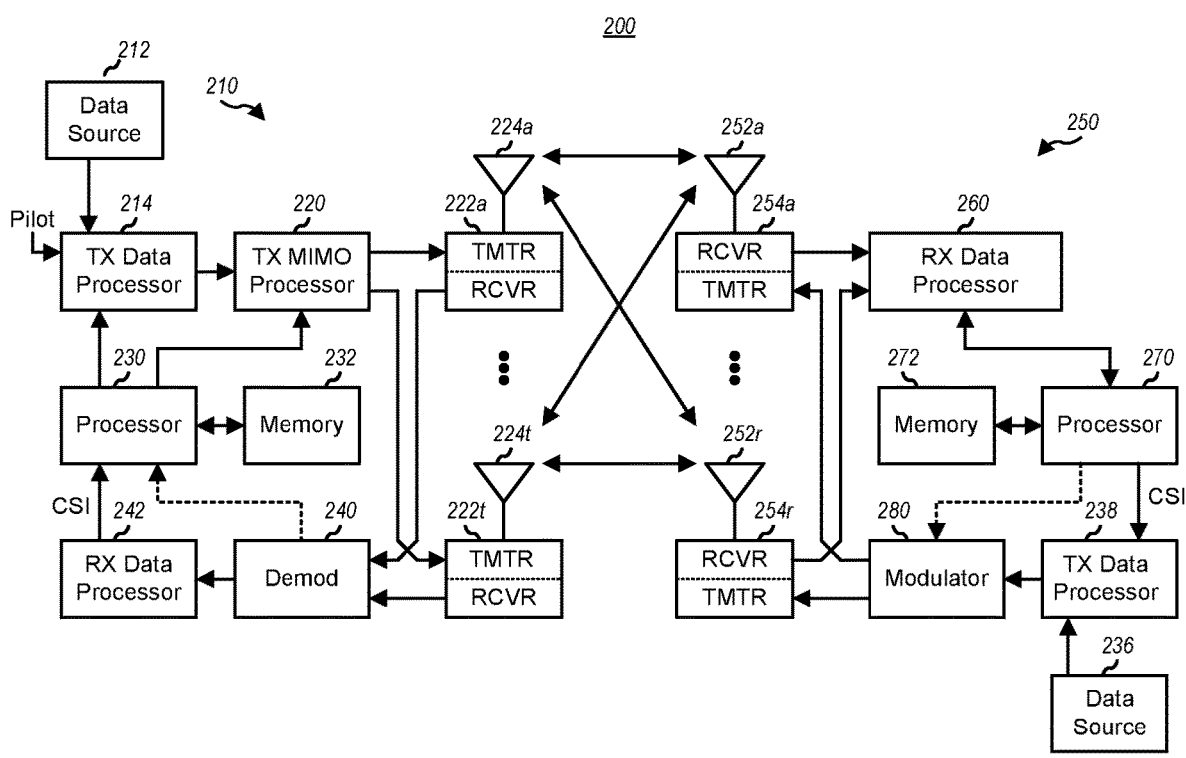
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides N T modulation symbol streams to N T transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. N T modulated signals from transmitters 222a through 222t are then transmitted from N T antennas 224a through 224t, respectively.

At receiver system 250, the transmitted modulated signals are received by N R antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the N R received symbol streams from N R receivers 254 based on a particular receiver processing technique to provide N T "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
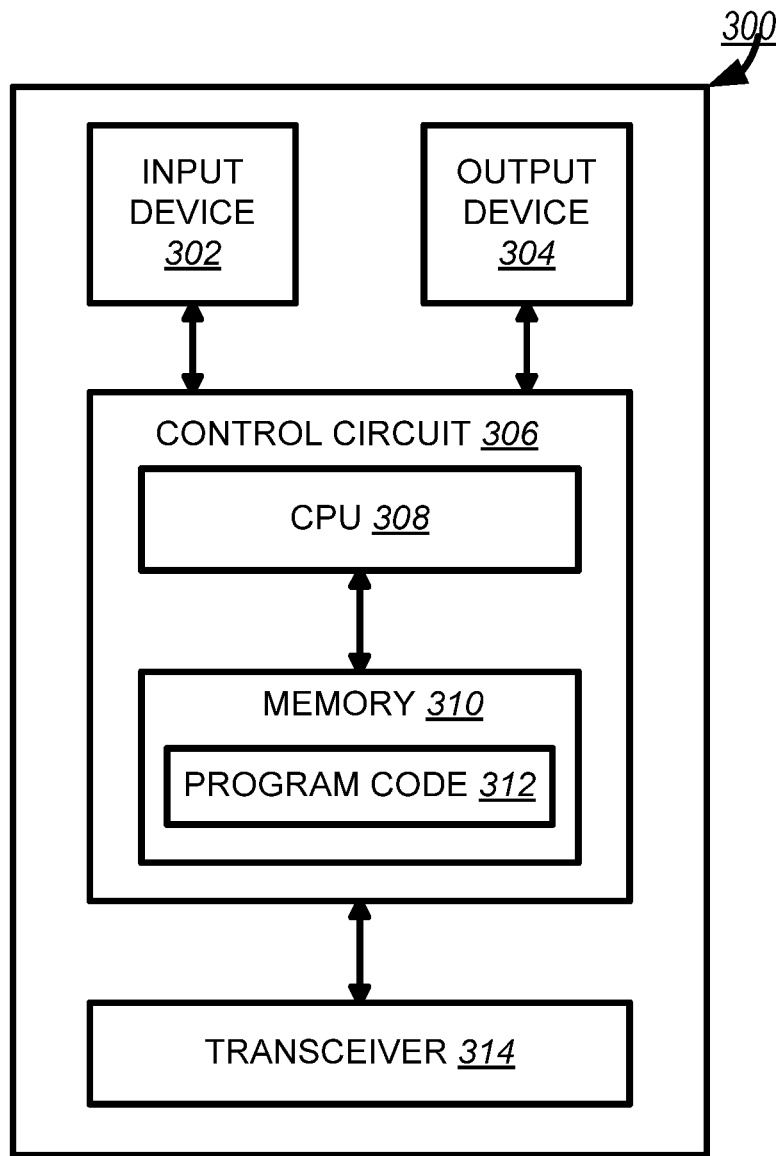
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE or NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
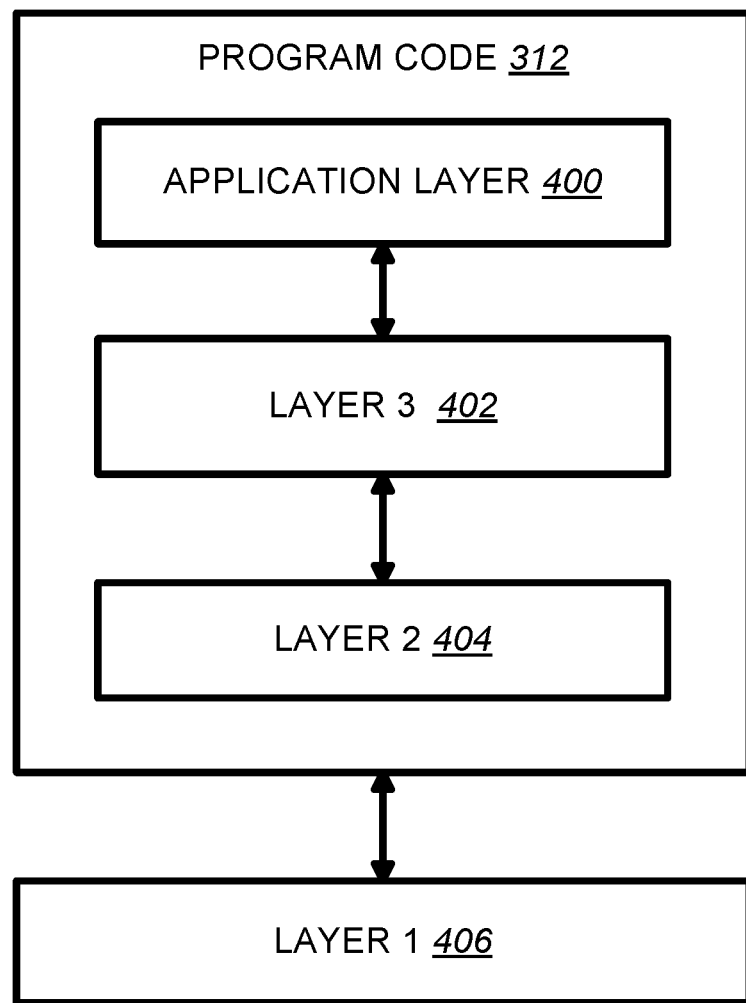
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 24.587 introduced the following procedures for Vehicle-to-Everything (V2X) communication over PC5 interface as follows:

6.1 V2X Communication Over PC5

6.1.1 General

This clause describes the procedures at the UE, and between UEs, for V2X communication over PC5.

The UE shall support requirements for securing V2X communication over PC5.

[ . . . ]

Both IP based and non-IP based V2X communication over PC5 are supported. For IP based V2X communication, only IPv6 is used. IPv4 is not supported in this release of the present document.

V2X messages carried over PC5 are exchanged using user plane and they can be sent or received over broadcast, unicast or groupcast depending on whether the user equipment (UE) is using the new radio (NR-PC5) or the evolved universal terrestrial radio access (E-UTRA-PC5).

NOTE: Further details about whether broadcast, unicast or groupcast can be used over PC5 are described in 3GPP TS 23.287 [3] clause 5.2.1.

6.1.2 Unicast Mode Communication Over NR Based PC5

6.1.2.1 Overview

This clause describes the PC5 signalling protocol procedures between two UEs for unicast mode of V2X communication. The following PC5 signalling protocol procedures are defined:

a) PC5 unicast link establishment;
b) PC5 unicast link modification;
c) PC5 unicast link release;
d) PC5 unicast link identifier update;
e) PC5 unicast link authentication;
f) PC5 unicast link security mode control; and
g) PC5 unicast link keep-alive.

6.1.2.2 PC5 Unicast Link Establishment Procedure 6.1.2.2.1 General

The PC5 unicast link establishment procedure is used to establish a PC5 unicast link between two UEs. The UE sending the request message is called the "initiating UE" and the other UE is called the "target UE".

6.1.2.2.2 PC5 Unicast Link Establishment Procedure Initiation by Initiating UE

[ . . . ]

The initiating UE shall meet the following pre-conditions before initiating this procedure:

a) a request from upper layers to transmit the packet for V2X service over PC5;
b) the link layer identifier for the initiating UE (i.e. layer 2 ID used for unicast communication) is available (e.g. pre-configured or self-assigned);
c) the link layer identifier for the unicast initial signaling (i.e. destination layer 2 ID used for unicast initial signaling) is available to the initiating UE (e.g. pre-configured, obtained as specified in clause 5.2.3 or known via prior V2X communication);
d) the initiating UE is either authorised for V2X communication over PC5 in NR in the serving PLMN, or has a valid authorization for V2X communication over PC5 in NR when not served by E-UTRAN and not served by NR; and
e) there is no existing PC5 unicast link for the pair of peer application layer IDs and the network layer protocol of this PC5 unicast link are identical to those required by the upper layer in the initiating UE for this V2X service.

In order to initiate the PC5 unicast link establishment procedure, the initiating UE shall create a DIRECT LINK ESTABLISHMENT REQUEST message. The initiating UE:

a) shall include the source user info set to the initiating UE's application layer ID received from upper layers;
b) shall include the V2X service identifier received from upper layer;
c) may include the target user info set to the target UE's application layer ID if received from upper layers; and
d) shall include the security establishment information.

[ . . . ]

After the DIRECT LINK ESTABLISHMENT REQUEST message is generated, the initiating UE shall pass this message to the lower layers for transmission along with the initiating UE's Layer 2 ID for unicast communication and the destination layer 2 ID used for unicast initial signaling, and start timer T5000. The UE shall not send a new DIRECT LINK ESTABLISHMENT REQUEST message to the same target UE identified by the same application layer ID while timer T5000 is running.

Figure 5:
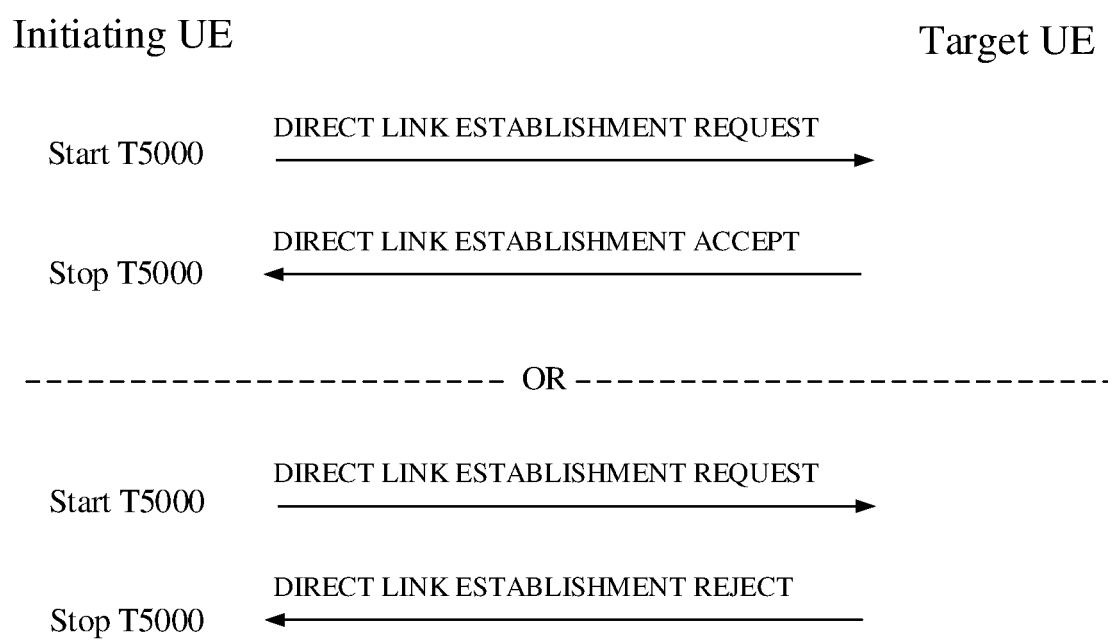
FIG. 5 is a reproduction of FIG. 6.1.2.2.2 of 3GPP TS 24.587 V2.0.0.
Figure 6:
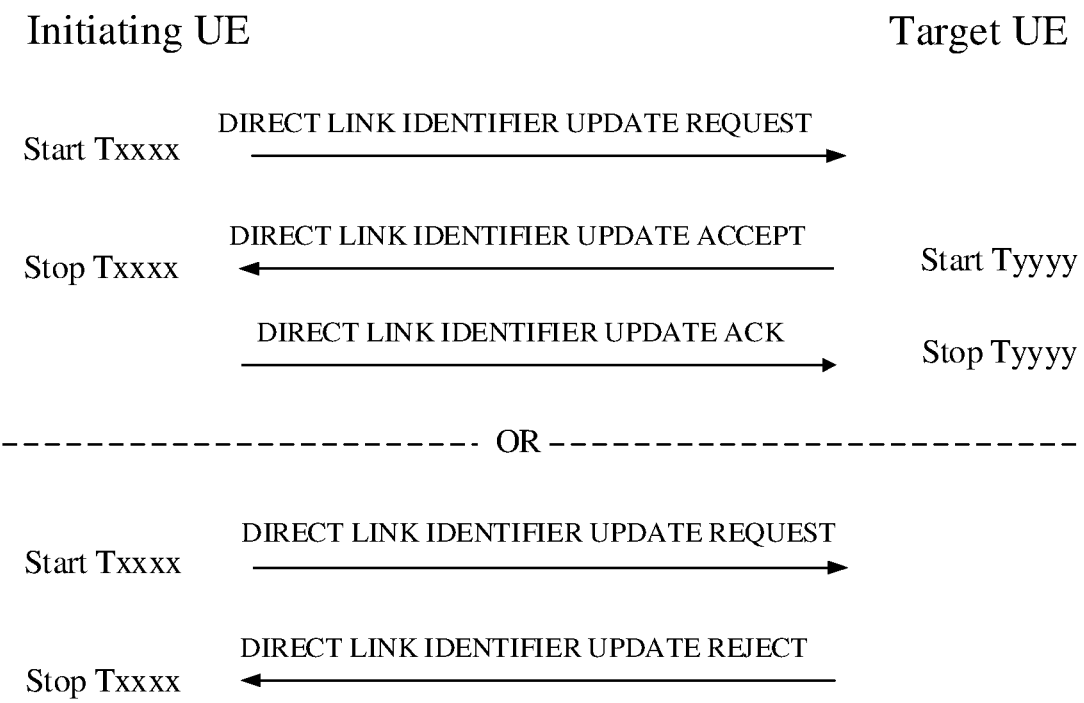
FIG. 6 is a reproduction of FIG. 6.1.2.5.2.1 of 3GPP TS 24.587 V2.0.0.

[FIG. 6.1.2.2.2 of 3GPP TS 24.587 V2.0.0, entitled "PC5 unicast link establishment procedure", is reproduced as FIG. 5]

6.1.2.2.3 PC5 unicast link establishment procedure accepted by the target UE

Upon receipt of a DIRECT LINK ESTABLISHMENT REQUEST message, the target UE shall assign a layer-2 ID for this PC5 unicast link and store this assigned layer-2 ID and the source layer 2 ID used in the transport of this message provided by the lower layers. This pair of layer-2 IDs is associated with a PC5 unicast link context.

If:

a) the target user info IE is included in the DIRECT LINK ESTABLISHMENT REQUEST message and this IE includes the target UE's application layer ID; or
b) the target user info IE is not included in the DIRECT LINK ESTABLISHMENT REQUEST message and the target UE is interested in the V2X service identified by the V2X service identifier in the DIRECT LINK ESTABLISHMENT REQUEST message;

then the target UE shall either identify an existing security context with the initiating UE, or establish a new security context by performing one or more PC5 unicast link authentication procedures as specified in clause 6.1.2.6, and performing the PC5 unicast link security mode control procedure as specified in clause 6.1.2.7.

Upon successful completion of the PC5 unicast link security mode control procedure, in order to determine whether the DIRECT LINK ESTABLISHMENT REQUEST message can be accepted or not, in case of IP communication, the target UE checks whether there is at least one common IP address configuration option supported by both the initiating UE and the target UE.

If the target UE accepts the PC5 unicast link establishment procedure, the target UE shall create a DIRECT LINK ESTABLISHMENT ACCEPT message. The target UE:

a) shall include the source user info set to the target UE's application layer ID received from upper layers;
b) shall include a PQFI and the corresponding PC5 QoS parameters;
c) may include an IP address configuration IE set to one of the following values if IP communication is used:

1) "IPv6 router" if only IPv6 address allocation mechanism is supported by the target UE, i.e. acting as an IPv6 router; or
2) "IPv6 address allocation not supported" if IPv6 address allocation mechanism is not supported by the target UE;
d) may include a link local IPv6 address IE formed locally based on IETF RFC 4862 if IP address configuration IE is set to "IPv6 address allocation not supported" and the received DIRECT LINK ESTABLISHMENT REQUEST message included a link local IPv6 address IE.

6.1.2.2.4 PC5 Unicast Link Establishment Procedure Completion by the Initiating UE Upon receipt of the DIRECT LINK ESTABLISHMENT ACCEPT message, the initiating UE shall stop timer T5000 and store the source layer-2 ID and the destination Layer-2 ID used in the transport of this message provided by the lower layers. This pair of layer-2 IDs shall be associated with a PC5 unicast link context. From this time onward the initiating UE shall use the established link for V2X communication over PC5 and additional PC5 signalling messages to the target UE.

[ . . . ]

6.1.2.5 PC5 Unicast Link Identifier Update Procedure 6.1.2.5.1 General

The PC5 unicast link identifier update procedure is used to update and exchange the new identifiers (e.g. application layer ID, layer 2 ID, security information and IP address/prefix) between two UEs for a PC5 unicast link before using the new identifiers. The UE sending the DIRECT LINK IDENTIFIER UPDATE REQUEST message is called the "initiating UE" and the other UE is called the "target UE".

6.1.2.5.2 PC5 Unicast Link Identifier Update Procedure Initiation by Initiating UE The initiating UE shall initiate the procedure if:
a) the initiating UE receives a request from upper layers to change the Application Layer ID and there is an existing PC5 unicast link associated with this Application Layer ID; or
b) the privacy timer of the initiating UE's layer 2 ID expires for an existing PC5 unicast link.

[ . . . ]

If the PC5 unicast link identifier update procedure is triggered by a change of the initiating UE's application layer ID, the initiating UE shall create a DIRECT LINK IDENTIFIER UPDATE REQUEST message. In this message, the initiating UE
a) shall include the initiating UE's new application layer ID received from upper layer;
b) shall include the initiating UE's new layer 2 ID assigned by itself;
c) shall include the new security information; and
d) may include the new IP address/prefix if IP communication is used.

If the PC5 unicast link identifier update procedure is triggered by the expiry of the initiating UE's privacy timer as specified in clause 5.2.3, the initiating UE shall create a DIRECT LINK IDENTIFIER UPDATE REQUEST message. In this message, the initiating UE
a) shall include the initiating UE's new layer 2 ID assigned by itself;
b) shall include the new security information;
c) may include the initiating UE's new application layer ID received from upper layer; and
d) may include the new IP address/prefix if IP communication is used.

[ . . . ]

After the DIRECT LINK IDENTIFIER UPDATE REQUEST message is generated, the initiating UE shall pass this message to the lower layers for transmission along with the initiating UE's old Layer 2 ID and the target UE's Layer 2 ID, and start timer T5003. The UE shall not send a new DIRECT LINK IDENTIFIER UPDATE REQUEST message to the same target UE while timer T5003 is running.

[FIG. 6.1.2.5.2.1 of 3GPP TS 24.587 V2.0.0, entitled "PC5 unicast link identifier update procedure", is reproduced as FIG. 6]

6.1.2.5.3 PC5 Unicast Link Identifier Update Procedure Accepted by the Target UE Upon receipt of a DIRECT LINK IDENTIFIER UPDATE REQUEST message, if the target UE determines:
a) the PC5 unicast link associated with this request message is still valid; and
b) the timer T5004 for the PC5 unicast link identified by this request message is not running,
then the target UE accepts this request and responds with a DIRECT LINK IDENTIFIER UPDATE ACCEPT message.

If the target UE has the privacy configuration as specified in clause 5.2.3 and decides to change its identifier, the target UE shall create the DIRECT LINK IDENTIFIER UPDATE ACCEPT message. In this message, the target UE:
a) shall include the target UE's new layer 2 ID assigned by itself;
b) shall include the new security information;
c) may include the target UE's new application layer ID received from upper layer; and
d) may include the new IP address/prefix if IP communication is used.

After the DIRECT LINK IDENTIFIER UPDATE ACCEPT message is generated, the target UE shall pass this message to the lower layers for transmission along with the initiating UE's old Layer 2 ID and the target UE's old Layer 2 ID, and start timer T5004. The UE shall not send a new DIRECT LINK IDENTIFIER UPDATE ACCEPT message to the same initiating UE while timer T5004 is running.

Before target UE receives the traffic using the new layer-2 IDs, the target UE shall continue to receive the traffic with the old layer-2 IDs (i.e. initiating UE's old layer-2 ID and target UE's old layer-2 ID) from initiating UE.

Before target UE receives the DIRECT LINK IDENTIFIER UPDATE ACK message from initiating UE, the target UE shall keep sending traffic to the initiating UE using the old layer-2 IDs (i.e. initiating UE's old layer-2 ID and target UE's old layer-2 ID).

6.1.2.5.4 PC5 Unicast Link Identifier Update Procedure Acknowledged by the Initiating UE Upon receipt of the DIRECT LINK IDENTIFIER UPDATE ACCEPT message, the initiating UE shall stop timer T5003 and respond with a DIRECT LINK IDENTIFIER UPDATE ACK message. In this message, the initiating UE:
a) shall include the target UE's new layer 2 ID, if received;
b) shall include the target UE's new security information, if received;
c) may include the target UE's new application layer ID, if received; and
d) may include the new IP address/prefix, if received.

Upon receipt of the DIRECT LINK IDENTIFIER UPDATE ACCEPT message. the initiating UE shall update the associated PC5 unicast link context with the new identifiers, and pass the initiating UE's new Layer 2 ID and the target UE's new Layer 2 ID down to the lower layer.

After the DIRECT LINK IDENTIFIER UPDATE ACK message is generated, the initiating UE shall pass this message to the lower layers for transmission along with the initiating UE's old Layer 2 ID and the target UE's old Layer 2 ID.

The initiating UE shall continue to receive traffic with the old layer-2 IDs (i.e. initiating UE's old layer-2 ID and target UE's old layer-2 ID) from the target UE until it receives traffic with the new layer-2 IDs (i.e. initiating UE's new layer-2 ID and target UE's new layer-2 ID) from the target UE.

6.1.2.5.5 PC5 Unicast Link Identifier Update Procedure Completion by the Target UE Upon receipt of the DIRECT LINK IDENTIFIER UPDATE ACK message, the target UE shall update the associated PC5 unicast link context with the new identifiers, pass the new initiating UE's Layer 2 ID and the new target UE's Layer 2 ID down to the lower layer and stop timer T5004.

[ . . . ]

In 3GPP TS 24.587, a procedure used to update L2ID (i.e. PC5 unicast link identifier update procedure) was introduced. This procedure is used to update the peer UE in the unicast communication of the impending change of the identifiers used for this unicast link. Due to the privacy requirements, in eV2X use, UE should frequently change its identifiers in order to avoiding being trackable by 3rd party. When the identifier change happens, all identifiers across all the layers, i.e. from application layer ID to L2 ID, need to be changed. This signalling is required before the identifier changes happen, to prevent service interruptions.

Possibly, the PC5 unicast link identifier update procedure could be initialized by an initiating UE when the initiating UE receives a request from upper layers to change the Application Layer ID or the privacy timer of the initiating UE's Layer-2 ID expires. In a unicast link, since Layer-2 ID used for transmission and reception on the unicast link is assigned by UE itself, both UEs of the unicast link maintain its privacy timer of its Layer-2 ID.

Figure 7:
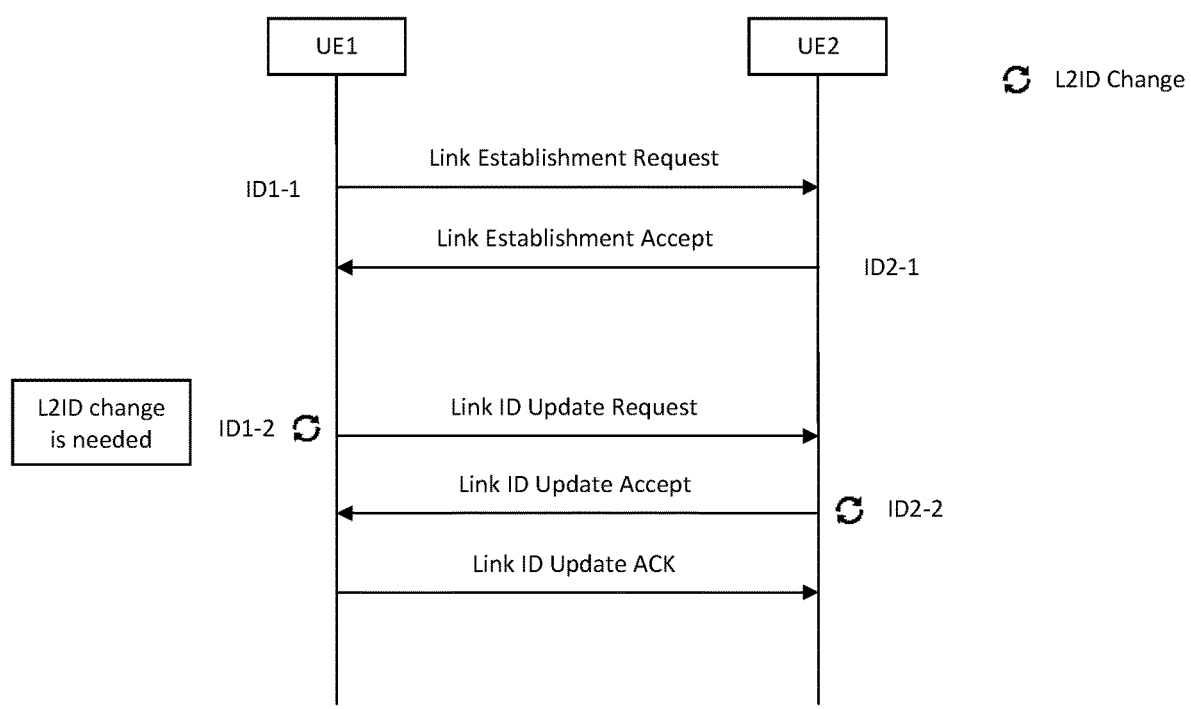
FIG. 7 is a flow chart illustrating Layer-2 ID change over unicast link between UE1 and UE2 according to one exemplary embodiment.

FIG. 7 is an exemplary flow chart illustrating Layer-2 ID change over unicast link between UE1 and UE2 according to one embodiment. In the beginning, UE1 would like to establish a unicast link with UE2. Thus, UE1 transmits a Link Establishment Request message (e.g. DIRECT LINK ESTABLISHMENT REQUEST in 3GPP TS 24.587) to UE2. For this unicast link, UE1 assigns a Layer-2 ID (L2ID) "ID1-1" by itself, and uses this L2ID to transmit the Link Establishment Request message.

Upon reception of the Link Establishment Request message, UE2 decides to establish the unicast link with UE1. Therefore, UE2 responds a Link Establishment Accept message (e.g. DIRECT LINK ESTABLISHMENT ACCEPT in 3GPP TS 24.587) to UE1. Similarly, UE2 assigns a L2ID "ID2-1" for this unicast link and uses this L2ID to transmit the Link Establishment Accept message.

Upon expiry of the privacy timer of UE1 for this unicast link, UE1 decides to change its old L2ID "ID1-1" to a new L2ID "ID1-2". For this change, UE1 initializes the PC5 unicast link identifier update procedure. UE1 transmits a Link ID Update Request message (e.g. DIRECT LINK IDENTIFIER UPDATE REQUEST) to UE2. In the Link ID Update Request message, the new L2ID "ID1-2" of UE1 is included.

Upon reception of the Link ID Update Request message, UE2 also changes its old L2ID "ID2-1" to a new L2ID "ID2-2" and then responds a Link ID Update Accept message (e.g. DIRECT LINK IDENTIFIER UPDATE ACCEPT) to UE1. In the Link ID Update Accept message, the new L2ID "ID2-2" of UE2 is included.

Upon reception of the Link ID Update Accept message, UE1 responds a Link ID Update ACK message (e.g. DIRECT LINK IDENTIFIER UPDATE ACK) to UE2. According to 3GPP TS 24.587, UE1 will update the L2IDs of the unicast link to the new L2ID "ID1-2" of UE1 and the new L2ID "ID2-2" of UE2 and pass the updated L2IDs to lower layers for sidelink transmission/reception on the unicast link. In the Link ID Update ACK message, the L2ID "ID2-2" of UE2 is included.

Upon reception of the Link ID Update ACK message, UE2 will update the L2IDs of the unicast link to the new L2ID "ID1-2" of UE1 and the new L2ID "ID2-2" of UE2, and will pass the updated L2IDs to lower layers for sidelink transmission/reception on the unicast link.

Figure 8:
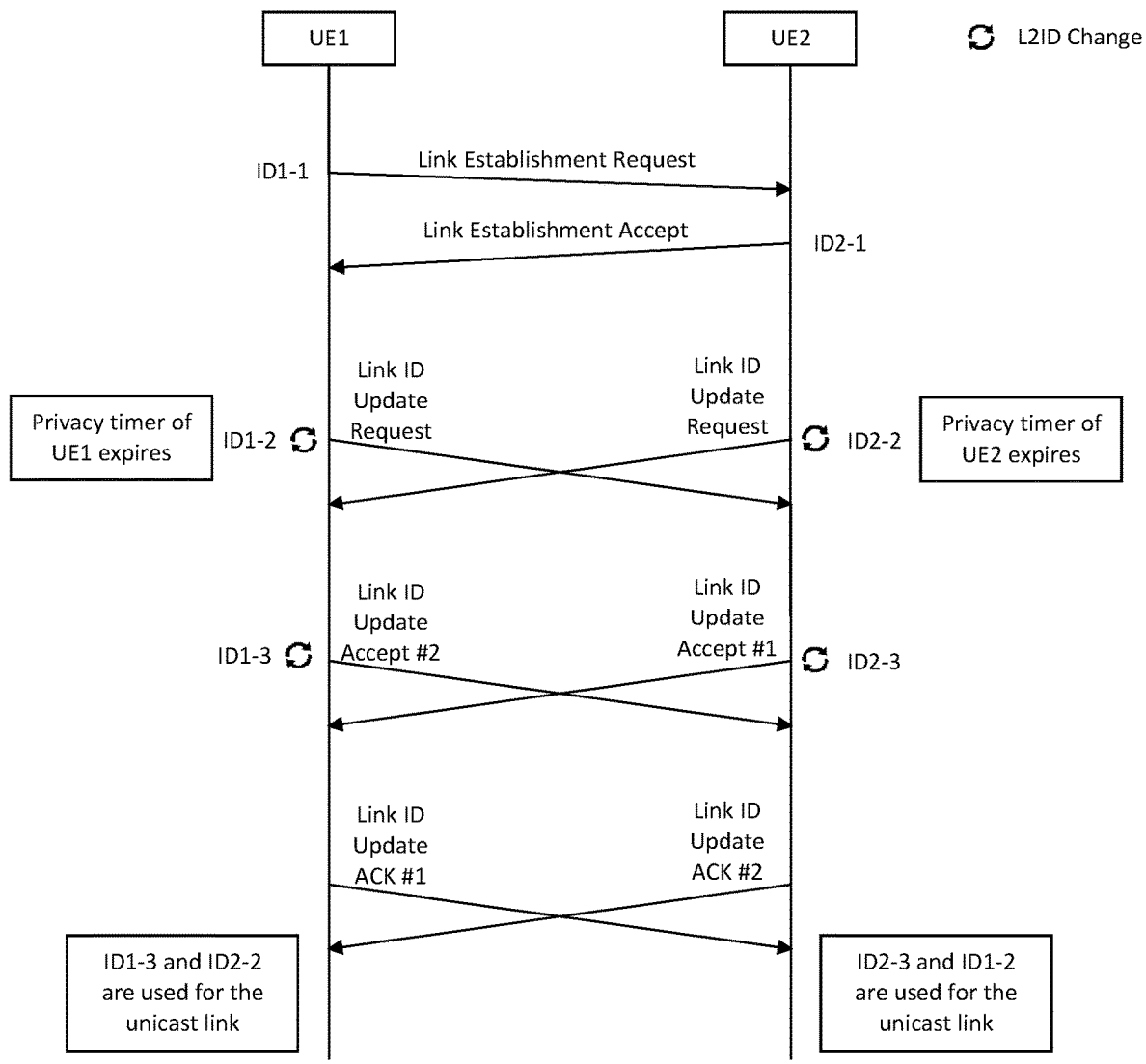
FIG. 8 is a flow chart illustrating another scenario (in addition to the exemplary scenario shown in FIG. 7) for both UEs taking privacy timer into account according to one embodiment.

FIG. 8 is an exemplary flow chart illustrating another scenario (in addition to the exemplary scenario shown in FIG. 7) for both UEs taking privacy timer into account according to one embodiment. UE1 initializes a first PC5 link identifier update procedure with UE2 when the privacy timer of UE1 expires. Thus, UE1 transmits a Link ID Update Request #1 message to UE2. In the Link ID Update Request #1 message, a new L2ID "ID1-2" of UE1 is included. Possibly, at this moment, the privacy timer of UE2 also expires so that UE2 initializes a second PC5 link identifier update procedure with UE1. Thus, UE2 transmits a Link ID Update Request #2 message to UE1. In the Link ID Update Request #2 message, a new L2ID "ID2-2" of UE2 is included. Since UE2 has not received the Link ID Update Request #1 message from UE1 yet, UE2 does not know UE1 has performed the first PC5 link identifier update procedure.

If the concept of PC5 link identifier update procedure introduced in 3GPP TS 24.587 and illustrated in FIG. 7 is followed, a new Layer-2 ID should be assigned when a Link ID Update Request message is received and a Link ID Update Accept message should be sent in response to reception of the Link ID Update Request message. Therefore, UE2 will change again a new L2ID "ID2-3" for the unicast link when the Link ID Update Request #1 message is received and transmit a Link ID Update Accept #1 message including the new L2ID "ID2-3" to UE1 in response to reception of the Link ID Update Request #1 message. Similarly, UE1 will change again a new L2ID "ID1-3" for the unicast link when the Link ID Update Request #2 message is received, and will transmit a Link ID Update Accept #2 message including the new L2ID "ID1-3" to UE2 in response to reception of the Link ID Update Request #2 message.

In response to reception of the Link ID Update Accept #1 message, UE1 transmits a Link ID Update ACK #1 message to UE2. Since a Link ID Update ACK message includes a target UE's new Layer-2 ID included in a corresponding Link ID Update Accept message sent by the target UE, UE1 includes the L2ID "ID2-3" included in the Link ID Update Accept #1 message in the Link ID Update ACK #1 message. Similarly, in response to reception of the Link ID Update Accept #2 message, UE2 transmits a Link ID Update ACK #2 message to UE1. UE2 includes the L2ID "ID1-3" included in the Link ID Update Accept #2 message in the Link ID Update ACK #2 message.

Upon reception of the Link ID Update ACK #1 message, UE2 updates L2IDs of the unicast link to the L2ID "ID1-2" of UE1 (as included in the Link ID Update Request #1 message) and the L2ID "ID2-3" of UE2 (as included in the Link ID Update Accept #1 message). On the other hand, upon reception of the Link ID Update ACK #2 message, UE1 updates L2IDs of the unicast link to the L2ID "ID1-3" of UE1 (as included in the Link ID Update Accept #2 message) and the L2ID "ID2-2" of UE2 (as included in the Link ID Update Request #2 message). As a result, both UEs use different L2ID pair for communicating each other on the unicast link and retransmissions using wrong L2ID pair will reach maximum retransmission opportunities in lower layers (e.g. at RLC layer, MAC layer or PHY layer) that will cause radio link failure.

According to 3GPP TS 24.587, the initiating UE should start timer T5003 when a Link ID Update Request message is generated for transmission, and should stop timer T5003 when a Link ID Update Accept message corresponding to the Link ID Update Request message is received from the target UE.

To address the L2ID pair misalignment issue, UE2 could include the L2ID "ID2-2", which has been included in the Link ID Update Request #2 message, in the Link ID Update Accept #1 message if such timer T5003 of UE2 for the Link ID Update Request #2 message is running. In other words, UE2 cannot assign a second new Layer-2 ID (e.g. "ID2-3") when the Link ID Update Request #1 message is received from UE1 but such timer T5003 of UE2 for the Link ID Update Request #2 message is still running.

From UE1's point of view, UE1 could include the L2ID "ID1-2", which has been included in the Link ID Update Request #1 message, in the Link ID Update Accept #2 message if such timer T5003 of UE1 for the Link ID Update Request #1 message is running, which means UE1 cannot assign a second new Layer-2 ID (e.g. "ID1-3") when the Link ID Update Request #2 message is received from UE2 but such timer T5003 of UE1 for the Link ID Update Request #1 message is still running.

With above solution, upon reception of the Link ID Update ACK #1 message, UE2 could update L2IDs of the unicast link to the L2ID "ID1-2" of UE1 (as included in the Link ID Update Request #1 message) and the L2ID "ID2-2" of UE2 (as included in the Link ID Update Accept #1 message and the Link ID Update Request #2 message). On the other hand, upon reception of the Link ID Update ACK #2 message, UE1 could update L2IDs of the unicast link to the L2ID "ID1-2" of UE1 (as included in the Link ID Update Accept #2 message and the Link ID Update Request #1 message) and the L2ID "ID2-2" of UE2 (as included in the Link ID Update Request #2 message). By this way, even if one PC5 unicast link identifier update procedure is performed on one side while another PC5 unicast link identifier update procedure is still ongoing on the other side, both UEs could still have the same L2ID pair for the unicast link after the both procedures are completed.

Alternatively, when one PC5 unicast link identifier update procedure is initialized on one side while another PC5 unicast link identifier update procedure is already ongoing on the other side, one of them could terminate or abort the ongoing PC5 unicast link identifier update procedure. Which UE terminates or aborts the ongoing PC5 unicast link identifier update procedure could be based on which UE requests establishment of the unicast link (e.g. this UE sends DIRECT LINK ESTABLISHMENT REQUEST message). For example, when UE2 receives the Link ID Update Request #1 message from UE1 while the timer T5003 of UE2 is running, UE2 could stop the timer T5003 of UE2 (since UE2 is not the UE requesting establishment of the unicast link). UE2 still responds the Link ID Update Accept #1 message to UE1. In this case, UE2 could include the L2ID "ID2-2" (as included in the Link ID Update Request #2 message) or the L2ID "ID2-3" (newly assigned due to reception of the Link ID Update Request #1 message) in the Link ID Update Accept #1 message. On the other hand, when UE1 receives the Link ID Update Request #2 message from UE2 while the timer T5003 of UE1 is running, UE1 may not respond any message corresponding to the Link ID Update Request #2 message to UE2 (since UE1 is the UE requesting establishment of the unicast link).

Alternatively, UE1 may respond a Link ID Update Reject message (e.g. DIRECT LINK IDENTIFIER UPDATE REJECT) to UE2 when UE1 receives the Link ID Update Request #2 message from UE2 while the timer T5003 of UE1 is running. The Link ID Update Reject message may include a cause value that indicates UE1 had started a PC5 unicast link identifier update procedure. In this situation, UE2 could stop the timer T5003 of UE2 when the Link ID Update Reject message is received from UE1.

With the above alternatives, UE1 will not newly assign another new L2ID e.g. "ID1-3" due to reception of the Link ID Update Request #2 message. As usual, when UE1 receives the Link ID Update Accept #1 message, UE1 could respond UE2 with the Link ID Update ACK #1 message including the new L2ID of UE2 included in the Link ID Update Accept #1 message.

It may also be possible that which UE terminates or aborts the ongoing PC5 unicast link identifier update procedure could be based on which UE accepts or completes establishment of the unicast link (e.g. this UE sends DIRECT LINK ESTABLISHMENT ACCEPT message). Therefore, the concept of behaviours in above examples/alternatives can be also applied for this possibility.

According to 3GPP TS 24.587, both the initiating UE and the target UE should update their Layer-2 IDs during the PC5 unicast link identifier update procedure. In other words, since one side always updates its Layer-2 ID when the other side updates its Layer-2 ID via the PC5 unicast link identifier update procedure, there is no need to maintain such privacy timer on each side. Therefore, one alternative could be that one of both UEs maintains the privacy timer of the unicast link. For example, either the initiating UE or the target UE could maintain the privacy timer for updating the L2ID pair of the unicast link. If the scenario illustrated in FIG. 8 applies this alternative, the second PC5 unicast link identifier update procedure would not be performed due to expiry of the privacy timer while the first PC5 unicast link identifier update procedure is ongoing. Thus, the L2ID pair misalignment in this scenario could also be addressed.

More specifically, the initiating UE could be the UE that requests a unicast link establishment (e.g. sending DIRECT LINK ESTABLISHMENT REQUEST). And, the target UE could be the UE that accepts or completes the unicast link establishment (e.g. sending DIRECT LINK ESTABLISHMENT ACCEPT).

According to Section 6.1.2.5.4 of 3GPP TS 24.587, upon receipt of the DIRECT LINK IDENTIFIER UPDATE ACCEPT message, the initiating UE shall update the associated PC5 unicast link context with the new identifiers, and pass the initiating UE's new Layer 2 ID and the target UE's new Layer 2 ID down to the lower layer. This implies that the lower layer(s) in the initiating UE may start data packet transmission using new L2 IDs after receiving the DIRCET LINK IDENTIFIER UPDATE ACCEPT message.

In addition, Section 6.1.2.5.5 of 3GPP TS 24.587 specifies that upon receipt of the DIRECT LINK IDENTIFIER UPDATE ACK message, the target UE shall update the associated PC5 unicast link context with the new identifiers and pass the new initiating UE's Layer 2 ID and the new target UE's Layer 2 ID down to the lower layer. Thus, the lower layer(s) in the target UE may start data packet reception using new L2 IDs after receiving the DIRCET LINK IDENTIFIER UPDATE ACK message. It is possible that data packets transmitted from the initiating UE may arrive at the target UE before the DIRECT LINK IDENTIFIER UPDATE ACK message because there may be data packets stored for transmission in the lower layer(s) of the initiating UE when the DIRECT LINK IDENTIFIER UPDATE ACCEPT message is received by the initiating UE. In this situation, these data packets may be discarded by the lower layer(s) in the target UE because the lower layer(s) has not received the new Layer 2 IDs.

To solve the above issue, one potential solution is generally for the initiating UE to pass the initiating UE's new Layer 2 ID and the target UE's new Layer 2 ID down to the lower layer(s) after the DIRCET LINK IDENTIFIER UPDATE ACK message is generated or passed to the lower layer(s) for transmission. Another alternative to align the timings in both UEs for using new Layer 2 IDs could be that the target UE passes the initiating UE's new Layer 2 ID and the target UE's new Layer 2 ID down to the lower layer(s) after the DIRCET LINK IDENTIFIER UPDATE ACCEPT message is generated or passed to the lower layer(s) for transmission (and before the DIRECT LINK IDENTIFIER UPDATE ACK message is received from the initiating UE). In another alternative, the target UE could pass the initiating UE's new Layer 2 ID and the target UE's new Layer 2 ID down to the lower layer(s) when the DIRCET LINK IDENTIFIER UPDATE ACCEPT message is generated or passed to the lower layer(s) for transmission.

Figure 9:
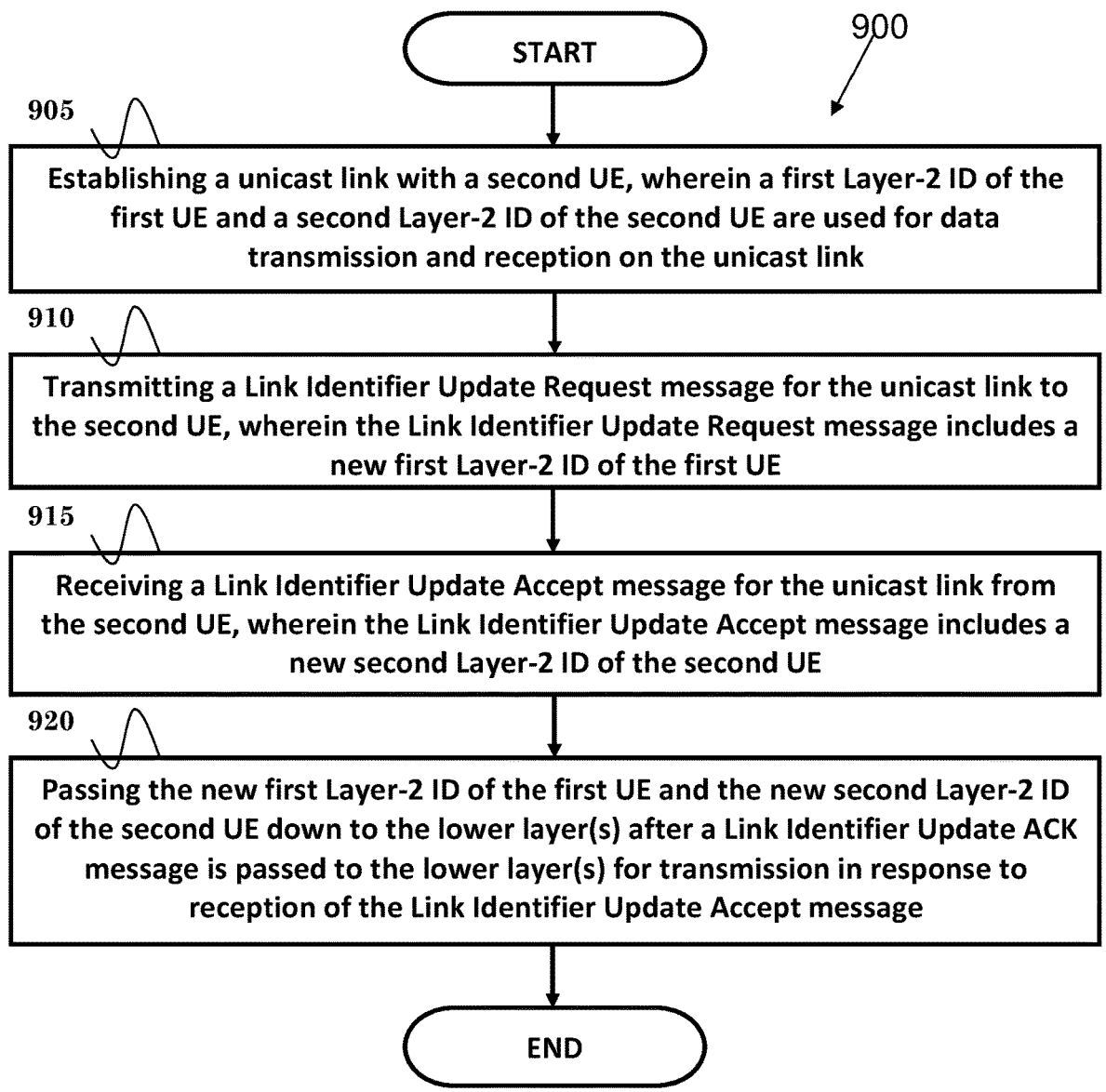
FIG. 9 is a flow chart according to one exemplary embodiment.

FIG. 9 is a flow chart 905 according to one exemplary embodiment from the perspective of a first UE for updating Layer-2 IDs. In step 905, the first UE establishes a unicast link with a second UE, wherein a first Layer-2 ID of the first UE and a second Layer-2 ID of the second UE are used for data transmission and reception on the unicast link. In step 910, the first UE transmits a Link Identifier Update Request message for the unicast link to the second UE, wherein the Link Identifier Update Request message includes a new first Layer-2 ID of the first UE. In step 915, the first UE receives a Link Identifier Update Accept message for the unicast link from the second UE, wherein the Link Identifier Update Accept message includes a new second Layer-2 ID of the second UE. In step 920, the first UE passes the new first Layer-2 ID of the first UE and the new second Layer-2 ID of the second UE down to the lower layer(s) after a Link Identifier Update ACK message is passed to the lower layer(s) for transmission in response to reception of the Link Identifier Update Accept message.

In one embodiment, the first UE could transmit the Link Identifier Update ACK message for the unicast link to the second UE with the first Layer-2 ID of the first UE and the second Layer-2 ID of the second UE, wherein the Link Identifier Update ACK message includes the new second Layer-2 ID of the second UE. The Link Identifier Update Request message could be a DIRECT LINK IDENTIFIER UPDATE REQUEST message, the Link Identifier Update Accept message could be a DIRECT LINK IDENTIFIER UPDATE ACCEPT message, and the Link Identifier Update ACK message could be a DIRECT LINK IDENTIFIER UPDATE ACK message. The lower layer(s) could be a Radio Link Control (RLC) layer, a Medium Access Control (MAC) layer, and/or a Physical (PHY) layer of the first UE.

Referring back to FIGS. 3 and 4, in one exemplary embodiment of a first UE. The first UE 300 includes a program code 312 stored in the memory 310. The CPU 308 could execute program code 312 to enable the first UE (i) to establish a unicast link with a second UE, wherein a first Layer-2 ID of the first UE and a second Layer-2 ID of the second UE are used for data transmission and reception on the unicast link, (ii) to transmit a Link Identifier Update Request message for the unicast link to the second UE, wherein the Link Identifier Update Request message includes a new first Layer-2 ID of the first UE, (iii) to receive a Link Identifier Update Accept message for the unicast link from the second UE, wherein the Link Identifier Update Accept message includes a new second Layer-2 ID of the second UE, and (iv) to pass the new first Layer-2 ID of the first UE and the new second Layer-2 ID of the second UE down to the lower layer(s) after a Link Identifier Update ACK message is passed to the lower layer(s) for transmission in response to reception of the Link Identifier Update Accept message. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention and including such departures from the present disclosure as come within the known and customary practice within the art to which the invention pertains.

The invention claimed is:

1. A method for a first User Equipment (UE) to update Layer-2 Identities (IDs), comprising:
   establishing a unicast link with a second UE, wherein a first Layer-2 ID of the first UE and a second Layer-2 ID of the second UE are used for at least one of data transmission or reception on the unicast link;
   generating a first Link Identifier Update Request message, comprising a new first Layer-2 ID of the first UE, of a procedure for updating Layer-2 IDs for the unicast link;
   starting a timer corresponding to the procedure for updating Layer-2 IDs responsive to generating the first Link Identifier Update Request message;
   transmitting the first Link Identifier Update Request message to the second UE; and
   stopping the timer if a second Link Identifier Update Request message is received from the second UE when the timer is running.

2. The method of claim 1, further comprising:
   transmitting a Link Identifier Update Accept message for the unicast link to the second UE in response to reception of the second Link Identifier Update Request message, wherein the Link Identifier Update Accept message comprises a new first Layer-2 ID of the first UE.

3. The method of claim 2, further comprising:
   receiving a Link Identifier Update Acknowledgement (ACK) message for the unicast link from the second UE with the first Layer-2 ID of the first UE and the second Layer-2 ID of the second UE, wherein the Link Identifier Update ACK message comprises the new first Layer-2 ID of the first UE.

4. The method of claim 3, wherein the Link Identifier Update ACK message is a DIRECT LINK IDENTIFIER UPDATE ACK message.

5. The method of claim 2, wherein the Link Identifier Update Accept message is a DIRECT LINK IDENTIFIER UPDATE ACCEPT message.

6. The method of claim 1, wherein the first Link Identifier Update Request message is a DIRECT LINK IDENTIFIER UPDATE REQUEST message.

7. The method of claim 1, further comprising:
   aborting the procedure for updating Layer-2 IDs if the second Link Identifier Update Request message is received from the second UE when the timer is running.

8. A first User Equipment (UE), comprising:
   a control circuit;
   a processor installed in the control circuit; and
   a memory installed in the control circuit and operatively coupled to the processor;
   wherein the processor is configured to execute a program code stored in the memory to:
      establish a unicast link with a second UE, wherein a first Layer-2 Identity (ID) of the first UE and a second Layer-2 ID of the second UE are used for at least one of data transmission or reception on the unicast link;
      generate a first Link Identifier Update Request message, comprising a new first Layer-2 ID of the first UE, of a procedure for updating Layer-2 IDs for the unicast link;
      start a timer corresponding to the procedure for updating Layer-2 IDs responsive to generating the first Link Identifier Update Request message;
      transmit the first Link Identifier Update Request message to the second UE; and stop the timer if a second Link Identifier Update Request message is received from the second UE when the timer is running.

9. The first UE of claim 8, further comprising:
transmitting a Link Identifier Update Accept message for the unicast link to the second UE in response to reception of the second Link Identifier Update Request message, wherein the Link Identifier Update Accept message comprises a new first Layer-2 ID of the first UE.

10. The first UE of claim 9, further comprising:
receiving a Link Identifier Update Acknowledgement (ACK) message for the unicast link from the second UE with the first Layer-2 ID of the first UE and the second Layer-2 ID of the second UE, wherein the Link Identifier Update ACK message comprises the new first Layer-2 ID of the first UE.

11. The first UE of claim 10, wherein the Link Identifier Update ACK message is a DIRECT LINK IDENTIFIER UPDATE ACK message.

12. The first UE of claim 9, wherein the Link Identifier Update Accept message is a DIRECT LINK IDENTIFIER UPDATE ACCEPT message.

13. The first UE of claim 8, wherein the first Link Identifier Update Request message is a DIRECT LINK IDENTIFIER UPDATE REQUEST message.

14. The first UE of claim 8, further comprising:
aborting the procedure for updating Layer-2 IDs if the second Link Identifier Update Request message is received from the second UE when the timer is running.

* * * * *